United States Patent [19]

Knusli et al.

[11] 3,764,678

[45] Oct. 9, 1973

[54] ORGANOTIN-SUBSTITUTED S-TRIAZINES FOR CONTROLLING INSECTS, ACARINAL, FUNGI, BACTERIA, AND MOLLUSKS

[75] Inventors: Enrico Knusli, Riehen; Denis Varsanyi, Arlesheim, both of Switzerland

[73] Assignee: Ciba-Geigy Corporation, Ardsley, N.Y.

[22] Filed: Apr. 21, 1970

[21] Appl. No.: 30,581

Related U.S. Application Data

[63] Continuation-in-part of Ser. No. 661,188, Aug. 17, 1967, abandoned, which is a continuation-in-part of Ser. No. 469,893, July 6, 1965, abandoned.

[52] U.S. Cl....................... 424/245, 424/245, 71/67
[51] Int. Cl............................................... A01n 9/22
[58] Field of Search ................. 424/245, 249; 71/67

[56] References Cited

UNITED STATES PATENTS

| | | | |
|---|---|---|---|
| 2,391,452 | 12/1945 | Friedheim | 260/242 |
| 3,130,193 | 4/1964 | Shan et al. | 260/242 |
| 3,326,906 | 6/1967 | Stamm | 260/242 |
| 3,412,090 | 11/1968 | Knosli et al. | 424/245 |

*Primary Examiner*—Stanley J. Friedman
*Assistant Examiner*—Vincent D. Turner
*Attorney*—Karl F. Jorda and Martin J. Spellman

[57] ABSTRACT

Pesticidal compositions containing as active substances organotin substituted s-triazines which possess insecticidal, acaricidal, ovicidal, fungicidal, bactericidal, bacteriostatic, molluscacidal and algaecidal activity are disclosed. Also methods for controlling pests on using said compositions are described.

31 Claims, No Drawings

ORGANOTIN-SUBSTITUTED S-TRIAZINES FOR CONTROLLING INSECTS, ACARINAL, FUNGI, BACTERIA, AND MOLLUSKS

This application as a continuation-in-part of our copending patent application Ser. No. 661,188, filed Aug. 17, 1967, now abandoned which in turn is a continuation-in-part of our patent application Ser. No. 469,893, filed on July 6, 1965, now abandoned.

DESCRIPTION OF THE INVENTION

The present invention concerns pesticidal agents which contain new organotin substituted s-triazines as active substances. It also concerns novel methods for combatting pests and microorganisms and for the protection of organic materials of all types from attack by pests and microorganisms.

The expression "pesticidal agent" in this application means those agents which contain active substances which have insecticidal, acaricidal, ovicidal, fungicidal, fungistatic, bactericidal, bacteriostatic, molluscacidal and algaecidal properties.

It has been found that organotin-substitted s-triazines of the formula

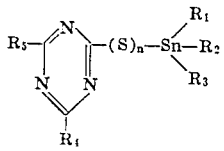

wherein each of $R_1$, $R_2$ and $R_3$ represents alkyl of from 3 to 8 carbon atoms, phenyl, chlorophenyl or benzyl, $R_4$ represents amino, alkylamino, lower alkoxy-lower alkylamino, alkenylamino, morpholino, cycloalkylamino or the grouping

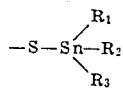

$R_5$ represents amino, alkylamino, lower alkoxy-lower alkylamine, alkenylamino, morpholino, the mercapto group, chlorine, bromine or the grouping 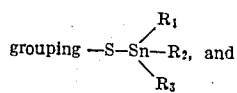 and $n$ represents 0 or 1, as well as their salts with inorganic and organic acids have excellent pesticidal properties and are thus suitable as active ingredients for pesticidal agents. The active substances and the agents produced therewith are suitable both for the protection of materials as well as of plants.

As alkylamine radicals represented by $R_4$ and $R_5$ are meant radicals having from 1 to 18 carbon atoms. As alkenylamino radicals $R_4$ and $R_5$ radicals having from 3 to 18 carbon atoms are understood. $R_4$ as cycloalkylamine radical represents cyclopentyl- or cyclohexylamino. As lower alkoxy-loweralkylamino radicals $R_4$ and $R_5$ are meant radicals having a total number of from 3 to 6 carbon atoms.

The new compounds of general formula I are obtained according to the present invention by reacting a triazine derivative of the formula

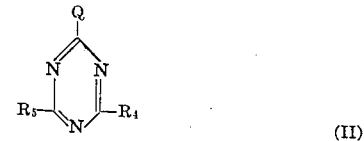

wherein $R_4$ and $R_5$ have the meanings given in formula I and Q is the mercapto group or a halogen atom, with at least one equivalent of an organo tin compound of the formula

wherein $R_1$, $R_2$ and $R_3$ have the meanings given in formula I and Y is a radical which can be split off as anion or cation, the reaction being performed in the presence of an inert gas for example, nitrogen and, if desired, in the presence of a solvent.

By a radical which can be split off as anion, symbolized by Y in Formula III, there is meant halogen, particularly chlorine, an alkoxy group such as the methoxy or ethoxy group, or a hydroxyl group; and an alkali metal ion such as the sodium, lithium or potassium ion is meant by a radical which can be split off as cation.

The reaction is preferably performed in the presence of a solvent which is inert to the reaction partners such as an aliphatic or aromatic hydrocarbon, e.g., benzene, toluene, xylene, an aliphatic or aromatic hydrocarbon, an ester, ketone or amide.

The new compounds of Formula I obtained by the process according to the invention are stable and colorless. They do not dissolve in water but are soluble in the usual organic solvents. They are used for the combatting of pests and microorganisms, for the protection of organic materials from attack by pests as insecticidal, acaricidal, ovicidal, fungicidal, fungistatic, bactericidal, bacteriostatic, molluscacidal and algaecidal active substances. In their effective doses for the above purposes they are well tolerated by warm blooded animals. The new compounds of Formula I are also excellent stabilizers for casin solutions and carbohydrate-containing solutions like, for instance, pastes containing starches.

For the protection of organic materials, the active substances of Formula I are either worked into the material or the material is impregnated with solutions of active substance which, if desired, contain surface active substances. In this way, keratin materials such as skins, leather, casein and also materials based on cellulose such as wood, staple fiber, paper, cotton, also preparations such as paints and lacquers, glues such as printing thickeners made from starch or cellulose derivatives, oils of all types, paper treatment liquors, plastics and synthetic fibers of all types, plasticisers, cosmetic articles, such as ointments, powders, soaps, etc. can be protected from attack by pests, in particular eating and sucking insects, bacteria and fungi. Solvents used for the impregnation of materials are, in particular, organic solvents such as petroleum fractions, alcohols and ethylene glycol monoalkyl ethers. For the protection of materials, advantageously solutions, dispersions or suspensions of the active substances are used which have a content of active ingredient of at least 0.01 g/liter.

In order to prepare the above-mentioned forms of application, conventional solid carrier materials can be used such as, for instance, kaolin, talcum, bentonite, sodium chloride, calcium phosphate, carbohydrate, cellulose powder, ground cotton seed, carbowax, gelatine, or liquids such as water, if desired with addition of surface-active compounds, for instance ionogenic or non-ionogenic dispersion agents, oils and other solvents which are non-toxic to the animal organisms, such as alcohols.

Another advantageous property of the compunds of Formula I is their molluscacidal activity. Solutions containing the compounds of the present invention are especially useful molluseacidally-active agents.

For the combatting of pests which injure plants, stored goods and health, the compounds of Formula I are applied in the form of dusts, sprinkling agents, granulates, wettable powders, pastes and emulsions as well as solutions.

The new compounds of Formula I can also be used for the disinfection of and for the protection of laundry from attack by microorganisms, as well as for use in dry cleaning agents. For this purpose, either washing or rinsing liquors are used which contain compounds of Formula I advantageously in concentrations of at least 0.01 percent or higher calculated on the weight of the liquor.

Examples of wash active substances contained in the washing liquors are anion active compounds such as aromatic sulfonic acids substituted by lipophilic groups, or their water soluble salts, e.g., the sodium salt of dodecyl benzene sulphonic acid or water soluble salts of sulphuric acid monoesters of higher molecular alcohols or their glycol ethers, e.g., soluble salts of dodecyl alcohol sulphate, or of dodecyl alcohol polyglycol ether sulphate, or alkali metal salts of higher fatty acids (soaps), in addition, non ionogenic wash active substances such as polyglycol ethers of higher fatty alcohols, also polyglycol ethers of higher alkylated phenols as well as so-called "amphoteric" wash active substances such as the reaction products of alkali metal salts of lower halogen fatty acids with polyalkylene polyamines having lipophilic radicals, e.g., with lauryl diethylenetriamine. In addition the liquor can also contain the usual auxiliaries such as water soluble alkali perborates, alkali polyphosphates, alkali carbonates, alkali silicates, optical brighteners, plasticisers, salts having an acid reaction such as ammonium or zinc silicofluoride or certain organic acids such as oxalic acid, also finishers, e.g., those based on synthetic resin or starch.

The compounds of general formula I according to the invention can also be used in combination with other anti-microbial substances, e.g., with halogenated diphenyl ureas, halogenated salicylanilides, halogenated hydroxydiphenyl ethers, halogenated benzoxazolones, polychlorohydroxy diphenyl methanes, halogendihydroxy-diphenyl sulphides, bactericidal 2-iminoimidazolidines or -tetrahydropyrimidines, biocidal quaternary compounds or with certain dithiocarbamic acid derivatives such as tetramethyl thiuram disulphide. The triazine organo tin derivatives according to the invention are very active against the bacterial flora causing perspiration odours and so, because of their slight toxicity, are to be used as deodorants for laundry and external human use such as in soaps, shampoos, or as additives to cosmetics such as ointments or creams.

The compounds of Formula I are excellently suitable as active ingredients in weed killers, particularly for the killing of weeds among cultivated plants as well as for hindering undesirable plant growth. By weeds are also meant here e.g., undesirable plants which have previously been cultivated. The organotin triazines defined above are also suitable as active substances for the influencing of plant growth in other ways, in particular for defoliation, e.g., of cotton plants, ripeness acceleration by early dehydration, e.g., of potato plants, also for the reduction of the amount of fruit formed, prolonging the harvesting period and time of storage.

It is an advantage of the biocidal compounds according to the invention that they show better stability and lower toxicity in concentrations of comparable biocidal activity, when compared with known biocidal organotin compounds.

The biocidal agents according to the invention are produced by known methods by intimately mixing and milling active substances of Formula I with suitable carriers, optionally with the addition of dispersing agents or solvents which are inert to the active substances. These agents can be used in the following forms:

Solid forms: dusts; sprinkling agents, granulates such as coated granulates, impregnated granulates and homogeneous granulates ;

Water dispersible concentrates of active substances: wettable powders, pastes, emulsions;

Liquid forms: solutions.

To produce the solid forms for use, namely dusts, sprinkling agents and granulates, the active substances are mixed with solid carriers. Examples of such carriers are kaolin, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, magnesium oxide, milled plastics, fertilisers such as ammonium sulphate, ammonium phosphates, ammonium nitrate, urea etc., ground vegetable products such as bran, bark dust, sawdust, ground nutshells, cellulose powder, residues of plant extractions, active charcoal etc. Each of these carriers can be used alone or admixed with each other.

The particle size of the carriers is, for dusts advantageously up to about 100 $\mu$, for sprinkling agents from about 75 $\mu$ - 0.2 mm and for granulates from 0.2 mm - 1 mm (and larger).

As a general rule, the concentrations of active substances in the solid preparations is from 0.5 - 80 percent. To these agents can also be added commercially available additives which stabilise the active substance and/or non-ionic, anionic and cationic surface active substances which improve the dispersibility of the active substances.

The concentrates of active substance which can be dispersed in water (wettable powders), pastes and emulsion concentrates, are agents which can be diluted with water to any concentration desired. They consist of active substance, carrier, optionally additives which stabilise the active substance, surface active substances and anti-foaming agents and, optionally, solvents. The concentration of active substance in these agents is 5–80 percent.

Wettable powders and pastes are obtained by mixing and milling the active substances with dispersing agents and pulverulent carriers in suitable mixers and milling machines until homogeneity is attained. Carriers are, for example, those mentioned in the paragraph dealing with solid forms for application. In some cases it is advantageous to use mixtures of carriers. Commercially available surface active substances can also be used as dispersing agents.

Examples of anti-foaming agents are: silicones, Antifoam A etc.

The active substances are so mixed, milled, sieved and strained with the additives mentioned above that the solid particle size in wettable powders is 20 – 40 $\mu$ and in pastes is not more than 3 $\mu$. To produce emulsion concentrates and pastes, liquid dispersing agents, organic solvents and water are used. Examples of solvents are: alcohols, benzene, xylenes toluene, dimethyl sulphoxide, dimethyl formamide and mineral oil fractions boiling between 120° and 350°. The solvents must be almost odorless, not phytotoxic, inert to the active substances and not easily inflammable.

In addition, the agents according to the invention can be in the form of and be used as solutions. For this purpose the active substances of Formula I are dissolved in suitable organic solvents, mixtures of solvents or in water. Higher aliphatic and aromatic hydrocarbons, chlorinated derivatives thereof, alkyl naphthalenes alone or mixed with each other or with water are used as organic solvents. The solutions should contain the active substances in a concentration from 1 to 20 percent.

The application forms described of the agents according to the invention can be mixed very well with other biocially active compounds or with agents containing such compounds. Thus, other active substances such as insecticides, fungicides or nematocides can be incorporated into the agents according to the present invention, in order to broaden the range of activity of the latter.

The following non-limitative examples serve to illustrate the various aspects of the present invention. Unless expressly stated otherwise, parts and percentages are given therein by weight and the temperatures are in degrees Centigrade.

EXAMPLE 1

30 Parts of 2-mercapto-4,6-bis-amino-s-triazine are slurried in 100 parts by volume of anhydrous toluene under an atmosphere of nitrogen and 59.6 parts of pure bis-(tri-n-butyl-tin)oxide are added. The reaction mixture is then refluxed for 6 hours while continuously introducing nitrogen. The water formed in the reaction is quantitatively removed from the reaction mixture by azeotropic distillation. Undissolved substance is removed from the remaining reaction solution and then the solvent is distilled off from the solution in vacuo. The residue is oily and crystallizes on standing. Recrystallized from petroleum ether, the 2-(tri-n-butyl-stannylthio)-4,6-bis-amino-s-triazine melts at 106°–108°. Because of its general pesticidal and in particular insecticidal, fungicidal and bacteriostatic properties, the compound can be used for the preparation of insecticidal sprays and dusts on following the instructions given below.

By repeating Example 1, but using instead of the starting s-triazine an equimolar amount of (Example 2): 2-mercapto-4,6-bis-n-octadecylamino-s-triazine,
(Example 3): 2-mercapto-4,6-bis-allyl-amino-s-triazine,
(Example 4): 2-mercapto-4-octadecyl-amino-6-morpholino-s-triazine,
(Example 5): 2-mercapto-4-hexylamino-6-cyclopentyl-amino-s-triazine,
(Example 6): 2-mercapto-4-octylamino-6-cyclohexyl-amino-s-triazine,
(Example 7): 2-mercapto-4,6-bis-decenylamino-s-triazine, there are obtained the 2-(tri-n-butyl-stannylthio)-bis-amino-s-triazines bearing the respective substituents at the amino nitrogen atoms in 4 and 6 position.

EXAMPLE 8

In the same way, on using 41.8 parts of anhydrous 2-mercapto-4,6-bis-ethylamino-s-triazine according to the process described in Example 1, 2-(tri-n-butyl-stannylthio)-4,6-bis-ethylamino-s-triazine is obtained first as a yellowish oil which crystallizes on cooling. On recrystallizing from anhydrous ethanol, the substance is obtained as crystals which melt at 95°–96°. Because of its pesticidal properties, which are similar to those of the final product of Example 1, it can be made up according to the methods given below into insecticidal wettable powders, fumigants and emulsion concentrates.

EXAMPLE 9

2-(tri-n-octyl-stannylthio)-4,6-bis-ethylamino-s-triazine is obtained by repeating Example 8, but using an equimolar amount of bis-(tri-n-octyl-tin(oxide in lieu of the bis-(tributyl-tin)oxide used in the said example.

EXAMPLE 10

2-(tri-n-hexylstannylthio)-4,6-bis-ethylamino-s-triazine is obtained by repeating Example 8, but using an equimolar amount of bis-(tri-n-hexyl-tin)oxide in lieu of the oxide used in the said example.

EXAMPLE 11

In the same way, on using 47.7 parts of anhydrous 2-mercapto-4,6-bis-isopropylamino-s-triazine according to the process described in Example 1, 2-(tri-n-butyl-stannylthio)-4,6-bis-isopropylamino-s-triazine is obtained as a yellow oil; refraction index $n_D^{20}$: 1.5488. Because of its pesticidal properties, the substance can be made up according to the instructions given below into insecticidal wettable powders and sprays or it can be used as disinfectant in soaps and detergents.

EXAMPLE 12

2-(tri-n-propylstannyl-thio)-4,6-bis-isopropylamino-s-triazine is obtained by repeating Example 11, but using an equimolar amount of bis-(tri-n-propyl-tin) oxide in lieu of the oxide used in Example 11.

It has pesticidal properties and can be made up into biocidal agents according to the instructions given below.

EXAMPLE 13

In the same way, on using 44.8 parts of anhydrous 2-mercapto-4-ethylamino-6-isopropylamino-s-triazine according to the method described in Example 1, 2-(tri-n-butyl-stannylthio) -4-isopropylamino-6-ethylamino-s-triazine is obtained as a yellow viscous oil which solidifies on cooling. Recrystallized from petroleum ether, the substance melts at 81°. It has pesticidal properties and can be made up into biocidal agents according to the instructions given below.

EXAMPLE 14

On using 41.85 parts of anhydrous 2-mercapto-4-methylamino-6-isopropylamino-s-triazine, 2(tri-n-butyl-stannylthio)-4-isopropylamino-6-methylamino-s-triazine is obtained by the process described in Example 1 as a yellow oil. It forms crystals on cooling which, recrystallized from petroleum ether, melt at 78°–79°. This substance also has pesticidal properties and can be further worked up according to the instructions given below.

EXAMPLE 15

2-(tri-n-propylstannyl-thio)-4-methylamino-6-isopropylamino-s-triazine is obtained by repeating Example 14, but using an equimolar amount of bis-(tri-n-propyl-tin)oxide in lieu of the oxide used in Example 14.

It has pesticidal properties and can be made up into biocidal agents according to the instructions given below.

EXAMPLE 16

2-(triphenyl-stannylthio)-4-methylamino-6-isopropylamino-s-triazine is obtained by repeating Example 14, but using an equivalent amount of triphenyl-tin hydroxide in lieu of the amount of bis-(tri-n-butyl-tin)oxide used in the said example.

It has pesticidal properties and can be made up into biocidal agents according to the instructions given below.

EXAMPLE 17

On using 18.6 parts of anhydrous trithiocyanuric acid and 89.4 parts of bis-(tri-n-butyl-tin)-oxide according to the method described in Example 1; 2,4,6-tris-(tri-n-butyl-stannylthio)-s-triazine is obtained as a clear yellowish oil $n_D^{20}$: 1.5521. The substance has pesticidal properties and can be used in washing liquors for textiles as a disinfectant for laundry.

EXAMPLE 18

2,4,6-tris-(tri-n-propylstannyl-thio)-s-triazine $n_D^{20}$ = 1.5655 is obtained by repeating Example 17, but using an equimolar amount of bis-(n-propyl-tin)oxide in lieu of the oxide used in Example 17.

It has pesticidal properties and can be made up into biocidal agents according to the instructions given below.

EXAMPLE 19

2,4-bis-(tri-benzylstannyl-thio)-6-mercapto-s-triazine, M.P. 110-112°, is obtained by repeating Example 17 but using in lieu of the 89.4 parts of bis-(tri-n-butyl-tin)-oxide, 81.8 parts of bis-(tribenzyl-tin)-hydroxide.

It has pesticidal properties and can be made up into biocidal agents according to the instructions given below.

EXAMPLE 20

A solution of 6 parts of sodium hydroxide in 100 parts by volume of anhydrous ethanol are added dropwise at 50°–60° to 12.10 parts of trithiocyanuric acid and 78 parts of triphenyl tin chloride suspended in 350 parts by volume of anhydrous ethanol and then the whole is refluxed for 5 hours. About two-thirds of the solvent are then distilled off in vacuo and the residue is poured into 1,500 parts of water. The precipitate formed is filtered off under suction, washed with water and recrystallized from ethylene glycol monomethyl ether. The 2,4,6-tris-(tri-phenylstannyl-thio)-s-triazine melts at 200°–202°.

This compound is useful as a pesticidal agent, particularly in paints and the like protective coatings and impregnation liquors applied on wood and other materials liable to be attacked by insects, fungi and for bacteria.

EXAMPLE 21

In a nitrogen atmosphere, 75.0 parts of triphenyl tin methoxylate are dissolved in 300 parts by volume of anhydrous toluene and mixed with 45.0 parts of pure 2-mercapto4,6-bis-isopropylamino-s-triazine. Then the reaction mixture is refluxed for 6 hours while nitrogen is being introduced continuously. The solvent is removed by vacuum distillation from the reaction solution which has been freed from undissolved portions. The glassy pure 2-(triphenyl-stannyl-thio)-4,6-bis-isopropylamino-s-triazine melts at 68°–70°.

This compound is useful as a pesticidal agent especially as fungicide, e.g., as agrigultural fungicide.

EXAMPLE 22

11 Parts of sodium metal are finely dispersed in 300 parts of boiling anhydrous petroleum ether. A mixture of 71.6 parts of tributyl tin chloride and 52.0 parts of 2-chloro-4,6-bis-diethylamino-s-triazines added dropwise to this dispersion, and the whole is heated for 8 hours while a continuous nitrogen stream is introduced. The solvent is removed by vacuum distillation after the reaction solution has been freed from undissolved matter and the oily residue is fractionated in vacuo. 2-(Tri-n-butyl-stannyl)-4,6-bis-diethylamino-s-triazine passing over at 148° – 152°/0.005 Torr is a faintly yellowish oil having a refraction index of $n_D^{20}$ = 1.5137.

This compound is an effective pesticidal agent and particularly useful, for instance, as a fungicide.

EXAMPLE 23

2-Chloro-4-(triphenyl-stannyl)-6-methylamino-5-triazine is obtained by adding to 35.7 parts of triphenyl tin lithium dispersed in 300 parts of tetrahydrofuran at about −5°, 17.8 parts of 2,4-dichloro-6-methylamino-s-triazine dissolved in 200 parts of tetrahydrofuran, leaving the resulting mixture stand for 24 hours, separating lithium chloride formed by filtration and eliminating the solvent by distillation in vacuo.

This compound is an effective pesticidal agent and particularly useful as bactericide and fungicide.

2-Bromo-4-(triphenyl-stannyl)-6-methylamino-s-triazine is obtained analogously, starting from 2,4-dibromo-6-methylamino-s-triazine.

EXAMPLE 24

2-(tri-p-chlorophenyl-stannylthio)-4-methylamino-6-isopropylamino-s-triazine is obtained from 20 parts of 2-mercapto-4-methylamino-6-isopropylamino-s-triazine which have been slurried in 100 parts by volume of anhydrous toluene under an atmosphere of nitrogen, and 47.0 parts of pure tri-p-chlorophenyl-tin hydroxide, by following the procedure described in Example 1.

According to the procedures described in the examples above, the following compounds were prepared which correspond to the formula:

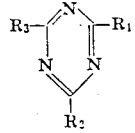

In the following text the production and composition of typical forms for application of the pesticidal agents according to the invention are described. Parts are given therein as parts by weight. Temperatures are given in degrees Centigrade.

| Ex. No. | $R_1$ | $R_2$ | $R_3$ | M.P. or $n_{20}^D$ |
|---|---|---|---|---|
| 25 | —HN—$C_2H_5$ | —HN-i-$C_3H_7$ | —S—Sn($C_6H_5$)$_3$ | 160–162° |
| 26 | —HN—$C_2H_5$ | —HN-sec-$C_4H_9$ | —S—Sn($C_4H_9$)$_3$ | 1.5520 |
| 27 | —HN—$C_2H_5$ | —HN-sec-$C_4H_9$ | —S—Sn($C_6H_5$)$_3$ | 143–145° |
| 28 | —HN—$C_2H_5$ | —HN-t-$C_4H_9$ | —S—Sn($C_4H_9$)$_3$ | 46.5–48.5° |
| 29 | —HN—$C_2H_5$ | —HN-t-$C_4H_9$ | —S—Sn($C_6H_5$)$_3$ | 174–176° |
| 30 | —HN-iso-$C_3H_7$ | —HN—$(CH_2)_3OCH_3$ | —S—Sn($C_4H_9$)$_3$ | 1.5472 |
| 31 | —HN-iso-$C_3H_7$ | —HN—$(CH_2)_3OCH_3$ | —S—Sn($C_6H_5$)$_3$ | 52–56° |
| 32 | —HN-iso-$C_3H_7$ | —HN—$CH_2$—CH=$CH_2$ | —S—Sn($C_6H_5$)$_3$ | 153–155° |
| 33 | —HN-n-$C_4H_9$ | —HN—$CH_2$—CH=$CH_2$ | —S—Sn($C_4H_9$)$_3$ | 1.5550 |
| 34 | —HN-n-$C_4H_9$ | —HN—$CH_2$—CH=$CH_2$ | —S—Sn($C_6H_5$)$_3$ | 124–126° |
| 35 | —HN—$C_2H_4$—$OCH_3$ | —HN—$CH_2$—CH=$CH_2$ | —S—Sn($C_4H_9$)$_3$ | 1.5575 |
| 36 | —HN—$C_2H_4$—$OCH_3$ | —HN—$CH_2$—CH=$CH_2$ | —S—Sn($C_6H_5$)$_3$ | 125–127° |
| 37 | —HN—$C_{18}H_{37}$ | —HN—$C_{18}H_{37}$ | —S—Sn($C_4H_9$)$_3$ | 39–41° |
| 38 | —HN—$C_{18}H_{37}$ | —NH—$C_{18}H_{37}$ | —S—Sn($C_6H_5$)$_3$ | 58–61° |
| 39 | —HN—$C_{18}H_{37}$ | —N⟨   ⟩O (morpholino) | —S—Sn($C_6H_5$)$_3$ | 88–92° |
| 40 | —HN—$C_{18}H_{37}$ | —N⟨   ⟩O (morpholino) | —S—Sn($C_4H_9$)$_3$ | 25° |
| 41 | —HN—$C_{18}H_{35}$ | —HN—$C_{18}H_{35}$ | —S—Sn($C_4H_9$)$_3$ | 1.5191 |
| 42 | —HN—$C_{18}H_{35}$ | —HN—$C_{18}H_{35}$ | —S—Sn($C_6H_5$)$_3$ | 1.5632 |
| 43 | —N⟨   ⟩O (morpholino) | —N⟨   ⟩O (morpholino) | —S—Sn($C_6H_5$)$_3$ | 210–212° |
| 44 | —N⟨   ⟩O (morpholino) | —N⟨   ⟩O (morpholino) | —S—Sn($C_4H_9$)$_3$ | 1.5574 |

"$C_6H_5$" in the above table represents the phenyl radical.

EXAMPLE I

1 Part of 2,4,6-tris-(tri-n-propylstannyl-thio)-s-triazine is intimately mixed with 99 parts of talcum. To produce a completely homogeneous mixture, this dust containing 1 percent of active substance is milled in a Kolloplex mill. This composition can be used for combatting cockroaches and ants.

EXAMPLE II

Wettable powders a. 25 Parts of 2-(tri-n-propylstannyl-thio)-4,6-bis-isopropylamino-s-triazine, 5 parts of a sulphonated hexadecyl glycol ether and 2.5 parts of a condensation product of sulphonated naphthalene and formaldehyde, and 67.5 parts of neutral sodium aluminum silicate are mixed and milled in a suitable apparatus. The 25 percent wettable powder obtained has good suspendibility and is distinguished by little foam formation.

b. 25 Parts of 2-(tris-n-butylstannyl-thio)-4,6-bis-ethylamino-s-triazine, 50 parts of a condensation product of cetyl polyglycol ether and 8 mol of ethylene oxide, 2.5 parts of a condensation product of sulphonated naphthalene and formaldehyde, 25 parts of purified kieselguhr and 42.5 parts of kaolin are mixed and milled in suitable apparatus. The wettable powder has very good wettability.

Suspensions of any concentration desired can be produced from these wettable powders by dilution with water. The suspensions are used for the combatting of pests which attack stored goods in granaries and warehouses, etc.

EXAMPLE III

Emulsion concentrates a. 25 Parts of 2-(tri-n-butylstannyl-thio)-4,6-bis-ethylamino-s-triazine are dissolved in 55 parts of xylene and 20 parts of nonylphenyl polyglycol ether. An emulsifiable solution is obtained which can be diluted with water to any concentration desired.

25 Parts of 2-(tri-n-butylstannyl-thio)-4,6-bis-dialkylamino-s-triazine are dissolved in 55 parts of petroleum distillate (boiling between 160° – 190°), 15 parts of polyglycol ether oleate and 5 parts of a combination emulsifying agent based on alkylaryl polyglycol ether and the calcium salt of an alkylaryl sulphonate. An emulsifiable solution is obtained which can be diluted to any concentration desired.

25 Parts of 2,4,6-tris-(tri-n-propylstannyl-thio)-s-triazine are dissolved in 55 parts of petroleum distillate (boiling between 160° – 190°), 15 parts of polyglycol ether oleate and 5 parts of a combination emulsifying agent based on alkylaryl polyglycol ether and the calcium salt of an alkylaryl sulphonate. A 25 percent emulsion concentrate is obtained which can be diluted with water to any concentration desired.

d. 10 parts of 2-(tri-phenylstannyl-thio)-4,6-bis-isopropylamino-s-triazine are mixed or dissolved with 20 parts of xylene, 20 parts of ethyl acetate, 30 parts of acetone and 20 parts of nonylphenyl polyethylene glycol ether. A 10 percent emulsion concentrate is obtained which can be diluted with water to any concentration desired. These emulsions are used for combatting pests which attack stored goods as well as midges and flies in houses, farm outhouses, warehouses, etc.

EXAMPLE IV

Sprays a. 2 Parts of 2-(tri-n-butylstannyl-thio)-4,6-bis-isopropylamino-s-triazine are dissolved in 10 parts of xylene and 88 parts of petroleum.

b. 2 Parts of 2-(tri-n-butylstannyl-thio)-4-isopropylamino-6-ethylamino-s-triazine and 3 parts of DDT active substance are dissolved in 95 parts of kerosene.

These solutions are sprayed under pressure. The solutions are used for combatting flies and midges in houses, warehouses and slaughter houses.

EXAMPLE V

Fumigants a. 20 Parts of 2,4,6-tris-(tri-n-propylstannyl-thio)-1,3,5-triazine are mixed with 61 parts of sawdust which has previously been impregnated with 18.4 parts of potassium nitrate and the mixture is formed under pressure into tablets.

b. 50 Parts of 2-(tri-n-butylstannyl-thio)-4,6-bis-ethylamino-s-triazine, 22 parts of sugar, 12 parts of potassium chlorate, 2.4 parts of potassium nitrate and 13.6 parts of sawdust are milled and intimately mixed. The fumigant mass is filled into tins and fitted with a wick or a fuse.

The fumigants serve to combat flies and midges in houses and warehouses.

In the following, the use of the active substances according to the invention for the protection of organic material such as textiles, plastics, wood, paper and oil and for the protection of plants is described.

I. Use in the washing liquor for textiles

The following active substances were tested as to their suitability for use for the protection of textiles:

2,4,6-tris-(tri-n-butylstannyl-thio)-s-triazine,
2,4,6-tris-(tri-n-propylstannyl-thio)-s-triazine,
2,4,6-tris-(triphenylstannyl-thio)-s-triazine,
2-(tri-n-butylstannyl-thio)-4,6-diamino-s-triazine,
2,4-bis-(tribenzylstannyl-thio)-6-mercapto-s-triazine,
2-(tri-n-propylstannyl-thio)-4,6-bis-isopropylamino-s-triazine,
2-(tri-n-butylstannyl-thio)-4,6-bis-isopropylamino-s-triazine,
2-(tri-n-butylstannyl-thio)-4-isopropylamino-6-methylamino-s-triazine,
2-(tri-n-butylstannyl-thio)-4-isopropylamino-6-ethylamino-s-triazine,
2-(tri-n-butylstannyl-thio)4,6-bis-ethylamino-s-triazine,
2-(triphenylstannyl-thio)-4,6-bis-isopropylamino-s-triazine.

EXAMPLE A

The solution of 1 part of one of the above active substances in 20 parts of ethylene glycol monomethyl ether is added to a washing liquor which contains 1.5 g of sodium soap per litre. Cotton cambric is introduced into this liquor, which contains 0.1 percent active substance per litre, (liquor ratio 1:20) and the bath is heated to 40°. The cotton is treated for 20 minutes at this termperature, then rinsed twice for 3 minutes at 40° with permutite water (liquor ratio 1:20), wrung out, dried and ironed.

Testing the action on bacteria

Circular samples each of 20 mm diameter cut from the textile washed and finished according to Example A are laid on agar plates which have previously been injected with 24 hour old cultures of Staphylococcus aureus SG 511 or with about 5 day old cultures of Aspergillus niger. The agar plates are stored for 24 hours at 37°.

Result

The circular samples treated with the organo tin triazine derivatives have neither Staphylococcus aureus SG 511 nor Aspergillus niger and areas free from bacteria and fungi are formed on the agar around the samples.

EXAMPLE B

The amount of a solution of the above active substances in ethylene glycol monomethyl ether corresponding to 100 mg of active substance per litre (1 part active substance in 20 parts of solvent) is added to equal parts of a washing liquor which contains 0.3 g per litre of octylphenyl polyglycol ether and 1.7 g of sodium polyphosphate per litre. Cuttings from cottom cambric are washed for 20 minutes at 90° in each of the liquors so prepared, liquor ratio 1:20, then rinsed with permutite water in a liquor ratio 1:20, then squeezed out, dried and ironed.

The testing of the goods treated as to their resistance to attack by bacteria and fungi is performed by the method described in Example A Result The cottom treated as described above remained free from bacteria and fungi.

EXAMPLE C

The solution of one of the above active substances in ethylene glycol monomethyl ether (1 part of active substance in 20 parts of solvent) is added to equal parts of a washing liquor containing 1.5 g of sodium soap per litre, so that the concentration of active substance is 100 mg per litre in each liquor. Wool muslin is washed at 40° in these preparations, liquor ratio 1:20. The textile is left for 20 minutes at this temperature, then rinsed twice for 3 minutes at 40° with permitite water, liquor ratio 1:20, squeezed out and dried.

The testing of the goods treated as to their resistance to the growth of bacteria is performed by the method described in Example A.

Result

The goods treated according to Example C with the active substances given above remained free from Staphylococcus aureus SG 511 and Aspergillus niger and areas free from bacteria and fungi are formed on the agar around the samples.

EXAMPLE D

Nylon staple fibres are treated as described in Example C with liquors prepared as given therein.

The testing of the goods treated as to their resistance to the growth of bacteria and fungi is performed as described in Example A.

Result

Here also, the goods treated with the active substances given above were found to be free from Staphylococcus aureus SG 511. The samples were surrounded by clear zones on the agar which were free from bacteria.

II Use in dry cleaning

EXAMPLE E

Samples of cotton cambric are washed with a dry cleaning agent containing 5 mg active substance per liter pure trichloroethylene. The samples are then squeezed between layers of filter paper and afterwards hung to dry in the air at room temperature. Testing of the treated cotton cuttings as to their bactericidal action according to Example A shows that the treated cotton fabric has been given a bactericidal and fungicidal finish.

In dry cleaning according to the process described above, the active substances given under I "Use in washing liquors for textiles" produced samples in which neither Staphylococcus aureus SG 511 nor Aspergillus niger could be found and areas free from bacteria and fungi are formed on the agar.

III Use in plastics

EXAMPLE F

200 Parts of polyamide granulate ("Grilon A 25 G," Emser-Werke AG, Domat-Ems and 1 part of active substance are mixed in a suitable mixer in a dry state for 10–15 minutes and then formed in an injection-extrusion moulding machine at 260° into sheets of 55 × 36 mm and 1 mm thickness. Circular samples of 5 mm diameter are cut from the polyamide sheets. The bactericidal activity is tested by placing the samples on nutrient agar which has previously been injected with 24 hours old cultures of Staphylococcus aureus SG 511 or with 5 day old cultures of Aspergillus niger. The agar is then kept for 24 hours at 37°. At the end of this time, clearly visible inhibition zones can be seen around the samples.

EXAMPLE G

65 Parts of polyvinyl chloride ("Lonza G," Lonza AG, Basle), 35 parts of dibutyl sebacate and 2 parts of dibutyl tin laurate are first mixed with 0.5 part of active substance, the mixture is then homogenized on a set of mixing rollers for 10 minutes at 160° and drawn out into films of 0.3 mm thickness. As a comparison, films are produced in the same way but without the addition of the active substance. From the films produced, among which there is no visual difference, circular samples of 20 mm diameter are cut. These samples are placed in petri dishes. The petri dishes contain agar which has previously been injected with 24 hour old cultures of Staphylococcus aureus SG 511 or with 5 day old cultures of Aspergillus niger. The agar dishes are then kept for 24 hours at 37°. At the end of this time, clear zones of inhibition can be seen.

EXAMPLE H 0.8 percent active substance in the form of a solution in 6 percent sodium hydroxide stock solution is added to 200 g of a viscose spinning solution containing 9.0 percent cellulose, the amount of active substance being calculated on the weight of the cullulose. The stock solution is prepared by previously dissolving the active substance in 6 percent aqueous sodium hydroxide solution in a ratio of 1:12. This solution is intimately mixed with the viscose solution for 20 minutes. Air is then removed from the viscose solution. Viscose films are then produced in the known way which are afterwards washed, desulphurized and dried. Circular samples of 20 mm diameter are cut from the viscose films and placed on nutrient agar which has previously been injected with 24 hour old cultures of Staphylococcus aureus SG 511 or 5 day old cultures of Aspergillus niger. The agar plates are kept for 24 hours at 37°. At the end of this time clear zones of inhibition can be seen.

IV. Use as preservative against blue stain

The process used is taken from: H. Butin "Holz als Roh- und Werkstoff" 19, 195 (1961).

EXAMPLE J

The active substances are incorporated in a concentration of 1 percent into the preservative. 0.2 ml of the preservative are applied to each block of pitch pine sap wood, the blocks being 4 × 5 cm. Alkyl resin lacquer is then painted over the preservative. 30 ml of a fungus suspension were then applied to each Kolle dish containing the wood samples, each of which dishes were covered with 10 circles of filter paper of 10 cm diameter. Pullularia pullulans was used as fungus. The Kolle dishes were kept for 6 weeks at 24° at 85 percent relative humidity after which the blue stain on the wood samples was judged by measuring the depth of the zones free from blue stain.

Results: (given in millimeters)

| active substance | depth of zone free from blueing without treatment with active substance | depth of zone free from blueing with treatment with act. substance |
| --- | --- | --- |
| 2-(tri-n-butylstannyl-thio)-4,6-bis-ethylamino-s-triazine | 0 | 9 |
| 2-(tri-n-butylstannyl-thio)-4-isopropylamino-6-methylamino-s-triazine | 0 | 5 |
| 2-(tri-n-butylstannyl-thio)-4,6-diamino-s-triazine | 0 | 2 |
| 2,4,6-tris-(tri-n-butylstannylthio)-s-triazine | 0 | 3 |
| Controls | 0 | 0 |

V. Use in paints based on dispersion dyestuffs

EXAMPLE K

A dispersion paint with a white pigment is used which is produced from a basis of copolymeric polyvinyl acetate as binder. It contains about 50 percent of solids. The active substance is dissolved in dimethyl formamide/ethylene glycol monomethyl ether (1:1) in a concentration of 5 percent. This stock solution is then added to the dispersion paint so that the ready-for-use dispersion paint contains 0.1 percent of active substance. 200 mg of dispersion paint is evenly painted on "Whatman No. 3 MM" filter paper circles of 40 mm diameter. The dry filter papers are then placed in petri dishes containing 20 ml of injected Sabouraud — Maltose Agar.

The test organisms used are : 1. Paecylomydes varioti, 5. Chaetomium globosum 2. Penicillium cyclopium 6. Aspergillus oryzae 3. Alternaria tenuis 7. Aspergillus niger 4. Metarrhizium glutinosum After storing for 7 days at 28° the zones free from fungus on the circles of filter paper are measured.

Results: (given in millimeters)

| Active substance in a concentration of 0.1% | Test organisms | | | | | | |
|---|---|---|---|---|---|---|---|
| | 1 | 2 | 3 | 4 | 5 | 6 | 7 |
| 2-(tri-n-butylstannyl-thio)-4,6-di(ethylamino)-s-triazine | 3 | 3 | 4 | 4 | 8 | 2 | 4 |
| Controls | 0 | 0 | 0 | 0 | 0 | 0 | 0 |

VI. Use in cutting oil

EXAMPLE L

1 Part of active substance dissolved in ethylene glycol monomethyl ether (1:1) is added to 100 parts of emulsifiable cutting oil. This cutting oil concentrate is diluted with distilled water so that in the emulsion a concentration of 0.1 percent of active substance is attained. 500 ml of this emulsion are sterilised by heating for 15 minutes at 120° in an autoclave. After testing the sterility, the emulsions are filled into glass vessels which can be aerated. A similar test is made with cutting oil not containing active substance. Air is bubbled through the emulsions for 7 days by means of a water jet pump. After 7 days, a sample of about 1 g of the emulsion is taken and it is diluted with physiological sodium chloride solution in a ratio of 1:1 or 1:100. 0.5 ml samples of this dilution are mixed with 15 ml melted, sterile nutrient agar and the mixture is poured into petri dishes. After storing the dishes for 48 hours at 37°, the colonies are counted. The glass vessels, after the 1 g sample has been taken therefrom, are injected with 2.5 ml a mixture of filtered earth suspension (earth:water = 1:2) and infected cutting oil emulsion (1:1). The test vessels are again aerated. After 24 hours and then after 7 days, again 1 g of the emulsion is removed and diluted with physiological sodium chloride solution in a ratio of 1:1 or 1:100. 0.5 ml of this dilution are mixed with 15 ml of sterile, melted nutrient agar, the mixture is poured into petri dishes and stored for 48 hours at 37°. The colonies are then counted on the plates. The following results are obtained:

which all test insects (100 percent) are immobilised or in the dorsal position.

TABLE

| active substance | test insects | |
|---|---|---|
| | mosquitoes | bean beetles |
| | Aedes aegyptii | Bruchidius obtectus |
| 2-(tri-n-butylstannyl-thio)-4,6-bis-ethylamino-s-triazine | 7' | 3 h |
| 2-(tri-n-butylstannyl-thio)-4,6-diamino-s-triazine | 11' | 5 h |
| 2,4,6-tris-(tri-n-butyl-stannyl-thio)-s-triazine | 18' | 36 h |
| 2-(tri-n-butylstannyl-thio)-4,6-bis-isopropylamino-s-triazine | 13' | 5 h |
| 2-(tri-n-butylstannyl-thio)-4-isopropylamino-6-ethylamino-s-triazine | 46' | 5 h |
| 2-(tri-n-butylstannyl-thio)-4-isopropylamino-6-methylamino-s-triazine | 21' | 24 h |

EXAMPLE N

Effect as stomach poison on larvae of potato beetle

The effect as insecticidal stomach poison is tested by spraying potato leaves with a 0.1 percent aqueous emulsion The leaves are allowed to dry and then 10 potato beetle larvae in the third stage of development are placed on each plant. The values given in the table are the time [minutes (') or hours (h)] in which all larvae (100 percent) are rendered immobile.

| active substance | potato beetle larvae |
|---|---|
| 2-(tri-n-butylstannyl-thio)-4,6-diamino-s-triazine | 5 h |
| 2-(tri-n-butylstannyl-thio)-4,6-bis-ethylamino-s-triazine | 5 h |
| 2,4,6-tris-(tri-n-butylstannyl-thio)-s-triazine | 24 h |

EXAMPLE O

Effect as stomach poison on larvae of the Mediterranean flour moth

The effect as insecticidal stomach poison on the larvae of the Mediterranean flour moth is determined in

| Concentration of emulsion 0.1% active substance | Number of bacteria found after test lasting— | | | | | |
|---|---|---|---|---|---|---|
| | 7 days, not injected | | 1 day, injected with earth | | 7 days, suspension infected oil | |
| | 1:1 | 1:100 | 1:1 | 1:100 | 1:1 | 1:100 |
| 2-(tri-n-butylstannyl-thio)-4,6-diamino-s-triazine | 2 | 0 | 100 | 10 | >10,000 | >10,000 |
| | 3 | 1 | 130 | 7 | | |
| 2,4,6-tris-(tri-n-butylstannyl-thio)-s-triazine | 2 | 0 | 160 | 4 | >10,000 | >10,000 |
| | 2 | | 246 | 20 | | |
| 2,4,6-tris-(tri-n-propylstannyl-thio)-s-triazine | 0 | 0 | 10 | 1 | >10,000 | 2,100 |
| | 0 | 0 | 9 | 4 | | 2,400 |
| 2-(tri-n-butylstannyl-thio)-4-isopropylamino-6-methylamino-s-triazine | 0 | 0 | 610 | 20 | >10,000 | 1,350 |
| | 1 | | 500 | 97 | | 1,600 |
| Control without addition of active substance | >100,000 | >100,000 | >100,000 | >100,000 | >100,000 | >100,000 |

NOTE.—Numbers = number of bacteria per plate containing a 0.5 ml. sample of the oil-emulsion dilution.

VII. Use in plant protection

Proof of insecticidal action

EXAMPLE M

Contact poison

The insecticidal contact action is tested by dissolving 1 mg of active substance in acetone, pouring the solution into Petri dishes and evaporating the solvent. After about 1 hour, the test insects given in the following Table were placed in the Petri dishes. The values given in the Table are the time [minutes (') or hours (h)] in the following way: 10 g of oat flakes are saturated with an acetone solution of 0.1 g of active substance. The acetone is evaporated off and, after several hours per test, 10 Mediterranean flour moth larvae in the third stage of development are placed in the oat flakes. After 6 days, the caterpillar mortality is determined in percent. (Temperature: 24°, relative humidity 40 – 60 percent).

| active substance | Mediterranean flour moth larvae |
|---|---|
| 2-(tri-n-butylstannyl-thio)-4,6- | |

| | |
|---|---|
| diamino-s-triazine | 100% |
| 2,4,6-tris-(tri-n-butylstannyl-thio)-s-triazine | 100% |
| 2-(tri-n-butylstannyl-thio)-4-isopropylamino-6-methylamino-s-triazine | 100% |

Phytofungicidal action

EXAMPLE P

Spore germination test

The fungicidal activity of the active ingredients of the general formula I was determined by a spore germination test with spores of the following types of fungi:

Alternaria tenuis
Botrytis cinerea
Clasterosporium c.
Coniothyrium dipl.
Fusarium culmorum
Mucor spec.
Penicillium spec.
Stemphylium cons.

A determined amount of a 1 percent, 0.1 percent and 0.01 percent acetone solution of active ingredient is placed on 2 glass slides of exactly the same size (26 × 76 mm) under the same conditions. The solvent is evaporated off and a uniform coating of active ingredient which can be inoculated is obtained on the glass slides. The slides inoculated with fungi spores are then kept in dishes at room temperature in an atmosphere which is almost saturated with steam. After 2 – 3 and 4 – 6 days, the germinated spores are counted.

The concentrations of active ingredient are given in the following Table which cause an inhibition of germination of at least 90 percent.

+ in the following Table shows an at least 90 percent inhibition of germination effected by the residue of 1 ml of a 1 percent acetone solution of active ingredient, ++ shows the same effect attained by the residue of a 0.1 percent acetone solution of the active ingredient, +++ shows an at least 90 percent inhibition of germination attained by the residue of 1 ml of a 0.01 percent acetone solution of active ingredient.

| Compound tested | Mortality in percent |
|---|---|
| 2-(tri-n-butyl-stannyl-thio)-4-isopropylamino-6-ethylamino-s-triazine | 100 |
| 2,4,6-tris-(tri-n-propyl-stannyl-thio)-1,3,5-triazine | 100 |
| 2-(tri-n-propyl-stannyl-thio)-4-isopropylamino-6-methylamino-s-triazine | 100 |

EXAMPLE T

Test on Australorbis glabratus

The molluscacidal activity was tested on aquatic snails, i.e., on Australorbis glabratus.

The tests were carried out along the lines recommended as standard by W.H.O.* According to this method, young snails of 10 mm diameter were immersed in solutions of the compounds to be tested for 24 hours. The snails were then removed, washed and placed in clean water for 48 hours (aerated water was used for all tests and 100 ml jars used as treatment containers).The values for the concentrations giving a mortality of 50 percent (LC 50) were obtained by plotting the dosage mortality data on log-probability paper.(*W.H.O. = World Health Organisation).

| Compound tested | LC 50 in ppm |
|---|---|
| 2,4,6-tris-(tri-n-butyl-stannyl-thio)-s-triazine | 0.04 |
| 2-(tri-n-butyl-stannyl-thio(-4,6-bis-isopropylamino-s-triazine | 0.13 |
| 2-(tri-n-butyl-stannyl-thio)-4-isopropylamino-6-ethylamino-s-triazine | 0.04 |
| 2-(tri-n-butyl-stannyl-thio)-4-isopropylamino-6-methylamino-s-triazine | 0.08 |
| 2,4,6-tris-(triphenyl-stannyl-thio)-s-triazine | 0.084 |

Stabilisation of casein-containing and starch-containing solutions.

EXAMPLE U

Casein solutions

The compounds to be tested are dissolved in water or

| Active substance | Alt. ten. | Botr. cin. | Clast. c. | Conioth. dipl. | Fus. culm. | Muc. spec. | Penic. spec. | Stemph cons. |
|---|---|---|---|---|---|---|---|---|
| 2-(tri-n-butylstannyl-thio)-4,6-bis-ethylamino-s-triazine | +++ | ++ | +++ | +++ | ++ | ++ | ++ | ++ |
| 2-(tri-n-butylstannyl-thio)-4,6-diamino-s-triazine | +++ | ++ | ++ | ++ | ++ | ++ | ++ | ++ |
| 2,4,6-tris-(tri-n-butyl-thio)-s-triazine | ++ | ++ | ++ | ++ | + | ++ | ++ | ++ |
| 2-(tri-n-butylstannyl-thio)-4,6-bis-isopropylamino-s-triazine | ++ | +++ | +++ | ++ | ++ | +++ | ++ | ++ |
| 2-(tri-n-butylstannyl-thio)-4-isopropylamino-6-ethylamino-s-triazine | ++ | +++ | +++ | ++ | ++ | ++ | ++ | ++ |
| 2-(tri-n-butylstannyl-thio)-4-isopropylamino-6-methylamino-s-triazine | ++ | +++ | +++ | ++ | ++ | ++ | ++ | +++ |
| 2-(tri-n-butylstannyl-thio)-4,6-bis-ethylamino-s-triazine | ++ | +++ | +++ | +++ | ++ | +++ | +++ | +++ |
| 2-(triphenyl-stannyl-thio)-4,6-isopropylamino-s-triazine | +++ | +++ | +++ | +++ | +++ | +++ | +++ | ++ |
| 2-tri-n-butyl-stannyl-thio)-4-allylamino-6-methoxyethylamino-s-triazine | +++ | +++ | +++ | +++ | ++ | +++ | +++ | +++ |
| 2-(triphenyl-stannyl-thio)-4-n-octadecylamino-6-morpholine-s-triazine | +++ | +++ | +++ | +++ | + | +++ | +++ | +++ |
| 2-(tri-n-butyl-stannyl-thio)-4-n-propylamino-6-methoxy-n-propylamino-s-triazine. | +++ | +++ | +++ | +++ | +++ | +++ | +++ | +++ |

EXAMPLE S

Molluscocidal Activity

The molluscocidal property was tested on the field slug, Agriolimax reticulatus, as follows:

9 cm filter papers were soaked in 1 cc of a 1.0 percent solution of the compounds to be tested. These papers were placed in 9 cm Petri dishes in which 3 slugs were placed plus a slice of carrot for food. After 48 hours' incubation at 15° C the mortality was assessed. Three replications per concentration level were made. The results of the tests are given below:

a solvent such as, for instance, ethyleneglycol ethylether in a proportion of 1:200 and added to a 10 percent casein solution consisting essentially of 10 g of powdered casein, 88 g of distilled water and 2g of concentrated ammonia (25 percent). The mixture is kept in an open glass vessel at 23° – 28° C. The number of days which the mixture stays unchanged, i.e. does not change its odor, its viscosity, or its aspect, is taken as a measure for the activity of the composition.

The results are given in the following table:

Compound tested                                            casein solution

| Compound tested | ppm of active substance in the substrate | |
| --- | --- | --- |
| | 12.5 No. of days | 25.0 No. of days |
| 2-(triphenyl-stannyl-thio)-4,6-bis-isopropylamino-s-triazine | 7 | 9 |
| 2-(triphenyl-stannyl-thio)-4-ethylamino-6-t-butyl-amino-s-triazine | 7 | 9 |
| Control | 4 | 4 |

EXAMPLE V

Starch-containing solutions

The compounds to be tested are dissolved in water or a solvent such as, for instance, ethyleneglycol ethylether in a proportion of 1:200. This solution is added to a 10 percent starch paste consisting essentially of 10 g of potato starch which was allowed to swell in 90 g of distilled water at 60°–65° C. The mixture is kept in a closed glass vessel at 23°–28° C. The number of days during which the mixture stays unchanged, i.e., does not change its viscosity or its odor is taken as measurement of the activity of the preparation.

The results are given in the following table:

| Compound tested | starch solution ppm active substance in the substrate | |
| --- | --- | --- |
| | 12.5 No. of days | 25.0 No. of days |
| 2-(tri-n-butyl-stannyl-thio)-4,6-bis-isopropylamino-s-triazine | 17 | 21 |
| 2-(triphenyl-stannyl-thio)-4-n-propylamino-6-allylamino-s-triazine | 15 | 17 |
| Control | 4 | 4 |

We claim:

1. A composition for combatting pests selected from the group consisting of insects, acarinae, fungi, bacteria, and mollusks comprising (1) a pesticidally effective amount of a compound of the formula

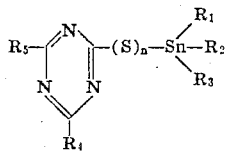

wherein
each of $R_1$, $R_2$ and $R_3$ represents alkyl of from 3 to 8 carbon atoms, phenyl, chlorophenyl or benzyl,
$R_4$ represents amino, alkylamino of from 1 to 18 carbon atoms, alkoxyalkylamino of from 3 to 6 carbon atoms, alkenyl amino of from 3 to 18 carbon atoms, morpholino, cycloalkyl amino of 5 or 6 carbon atoms or the grouping

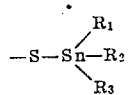

and $R_5$ represents amino, alkyl amino of from 1 to 18 carbon atoms, alkoxyalkyl amino of from 3 to 6 carbon atoms, alkenyl amino of from 3 to 18 carbon atoms, morpholino, mercapto, or the grouping

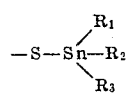

and (2) a currier

2. A method for controlling pests selected from the group consisting of insects, acarinae, fungi, bacteria, and mollusks which comprises applying to a substrate infested by said pests a pesticidally effective amount of a compound defined in claim 1.

3. A method according to claim 2 for controlling fungi in which the compound is applied in a fungi toxic amount.

4. A method according to claim 3 in which the compound is 2-(tri-n-butylstannylthio)-4,6-bis-ethylamino-s-triazine.

5. A method according to claim 3 in which the compound is 2-(tri-n-butylstannylthio)-4,6-bis-isopropylamino-s-triazine.

6. A method according to claim 3 in which the compound is 2-(tri-n-propylstannylthio)-4,6-bis-isopropylamino-s-triazine 7. A method according to claim 13 for controlling bacteria in which the compound is applied in a bactericidally effective amount.

8. A method according to claim 7 in which the compound is 2-(tri-n-butylstannylthio)-4,6-bis-ethylamino-s-triazine.

9. A method according to claim 7 in which the compound is 2-(tri-n-butylstannylthio)-4,6-bis-isopropylamino-s-triazine.

10. A method according to claim 7 in which the compound is 2-(tri-n-propylstannylthio)-4,6-bis-isopropylamino-s-triazine.

11. A method according to claim 2 for controlling insects in which the compound is applied in an insecticidally effective amount.

12. A method according to claim 11 in which the compound is 2-(tri-n-butylstannylthio)-4,6-bis-ethylamino-s-triazine.

13. A method according to claim 11 in which the compound is 2-(tri-n-butylstannylthio)-4,6-bis-isopropylamino-s-triazine.

14. A method according to claim 2 for controlling mollusks in which the compound is supplied in a molluskicidally effective amount.

15. A method according to claim 14 in which the compound is 2-(tri-n-butylstannylthio)-4,6-bis-isopropylamino-s-triazine.

16. A method according to claim 14 in which the compound is 2-(tri-n-propylstannylthio)-4-methylamino-6-isopropylamino-s-triazine.

17. A method for controlling pests selected from the group consisting of insects, acarinae, fungi, bacteria, and mollusks which comprises applying to said pests a pesticidally effective amount of a compound defined in claim 1.

18. A method according to claim 17 for controlling fungi in which the compound is applied in a fungi toxic amount.

19. A method according to claim 18 in which the compound is 2-(tri-n-butylstannylthio)-4,6-bis-ethylamino-s-triazine.

20. A method according to claim 18 in which the compound is 2-(tri-n-butylstannylthio)-4,6-bis-isopropylamino-s-triazine.

21. A method according to claim 18 in which the compound is 2-(tri-n-propylstannylthio)-4,6-bis-isopropylamino-s-triazine.

22. A method according to claim 17 for controlling bacteria in which the compound is applied in a bactericidally effective amount.

23. A method according to claim 17 for controlling insects in which the compound is applied in an insecticidally effective amount.

24. A method according to claim 17 for controlling mollusks in which the compound is applied in a molluskicidally effective amount.

25. A method according to claim 22 in which the compound is 2-(tri-n-butylstannylthio)-4,6-bis-ethylamino-s-triazine.

26. A method according to claim 22 in which the compound is 2-(tri-n-butylstannylthio)-4,6-bis-isopropylamino-s-triazine.

27. A method according to claim 22 in which the compound is 2-(tri-n-propylstannylthio)-4,6-bis-isopropylamino-s-triazine.

28. A method according to claim 23 in which the compound is 2-(tri-n-butylstannylthio)-4,6-bis-ethylamino-s-triazine.

29. A method according to claim 23 in which the compound is 2-(tri-n-butylstannylthio)-4,6-bis-isopropylamino-s-triazine.

30. A method according to claim 24 in which the compound is 2-(tri-n-butylstannylthio)-4,6-bis-isopropylamino-s-triazine.

31. A method according to claim 24 i which the compound is 2-(tri-n-propylstannylthio)-4-methylamino-6-isopropylamino-s-triazine.

* * * * *